United States Patent [19]
Ward

[11] Patent Number: 5,645,294
[45] Date of Patent: Jul. 8, 1997

[54] WHEEL STEERING AXIS INCLINATION, CASTER, AND CAMBER ADJUSTMENT ASSEMBLY SEAL AND PROTECTIVE COVER

[76] Inventor: Arlen Thad Ward, 4-Ward, Rte. 1, Box 40, Pawnee Rock, Kans. 67567

[21] Appl. No.: 165,083

[22] Filed: Dec. 10, 1993

Related U.S. Application Data

[63] Continuation-in-part of Ser. No. 10,075, Jan. 28, 1993, abandoned.

[51] Int. Cl.$^6$ ................................................ B62D 17/00
[52] U.S. Cl. ...................... 280/661; 277/59; 277/212 C
[58] Field of Search .......................... 280/661; 277/101, 277/152, 59, 188 R, 212 R, 212 F, 212 C, 105; 285/45, 264, 406

[56] References Cited

U.S. PATENT DOCUMENTS

| | | | |
|---|---|---|---|
| 1,788,414 | 1/1931 | Stevenson | 277/212 F |
| 2,376,017 | 5/1945 | Smallpiece | 277/105 |
| 4,867,472 | 9/1989 | Ward | 280/661 |
| 5,266,740 | 11/1993 | Hsu | 285/45 |

FOREIGN PATENT DOCUMENTS

| | | | |
|---|---|---|---|
| 886841 | 10/1943 | France | 285/45 |
| 69553 | 6/1892 | Germany | 277/105 |
| 82/02582 | 8/1982 | WIPO | 285/45 |

*Primary Examiner*—Eric D. Culbreth

[57] ABSTRACT

An inner assembly and/or an outer flange cover assembly for protecting a coupling between a pair of flanges such as on a wheel steering axis of inclination, caster, and camber adjustment assembly. The inner seal assembly is formed by a molded rubber flap and a stiffener attached thereto with grease disposed thereon. The outer flange cover assembly is formed by a pair of semi-circular rings, U-shaped in cross section, a gasket attached thereto, a hinge on one end and a pair of lip members at the other end. A method for protecting a coupling between a pair of flanges such as on a wheel steering axis of inclination, caster and camber adjustment assembly, by providing an inner seal assembly and/or an outer cover assembly. The inner seal assembly is disposed between the flanges of the wheel steering axis of inclination, caster and camber adjustment assembly. The outer cover assembly is disposed circumferentially on the flanges of the wheel steering axis of inclination, caster and camber adjustment assembly, after adjustment thereof, and sealed with a tamper-evident seal. The outer cover assembly may be clear to allow inspection of the flanges without removal thereof.

4 Claims, 6 Drawing Sheets

WHEEL STEERING AXIS INCLINATION, CASTER, AND CAMBER ADJUSTMENT ASSEMBLY SEAL AND PROTECTIVE COVER

This is a continuation-in-part application of copending patent application Ser. No. 08/010,075, filed Jan. 28, 1993 abandoned.

1. FIELD OF THE INVENTION

This invention is generally related to an inner seal and protective cover for a driven axle assembly of a four-wheel drive vehicle. More specifically, the present invention provides an improvement to a wheel steering axis inclination, caster, and camber adjustment assembly by providing a method and apparatus comprising an inner seal apparatus for sealing the drive axle from debris and water, and a protective cover apparatus for protecting the outside of the coupling of the drive axle and a drive wheel assembly. The protective cover functions as a covering seal.

2. DESCRIPTION OF THE PRIOR ART

A patentability investigation was conducted and the following United States patents by numbers were discovered: U.S. Pat. No. 2,189,265 to Alden; U.S. Pat. No. 2,995,389 to Johnson; U.S. Pat. No. 4,286,794 to Milstead et al.; U.S. Pat. No. 4,436,310 to Sawabe et al.; U.S. Pat. No. 2,828,983 to Hunt; U.S. Pat. No. 4,200,345 to Walker; U.S. Pat. No. 4,415,190 to Finck, Jr. et al.; and U.S. Pat. No. 4,747,805 to Welschof et al. None of the foregoing prior art U.S. patents teach or suggest the specific apparatus and/or method of the present invention. The present invention represents an improvement to my U.S. Pat. No. 4,867,472 entitled "Wheel Steering Axis Inclination, Caster, and Camber Adjustment Assembly." U.S. Pat. No. 4,867,472 is fully incorporated herein by reference thereto as if repeated verbatim hereafter. This patent discloses a wheel steering axis inclination, caster, and camber adjustment assembly. It does not disclose, however, the novel inner seal and/or outer cover, method and apparatus of the present invention as set forth hereinafter.

SUMMARY OF THE INVENTION

The present invention accomplishes its desired objects by broadly providing an inner seal assembly for sealing a coupling between a first flange member and a second flange member. The inner seal assembly comprises a first gasket means for engaging a drive shaft; and the first gasket means has an aperture such that the drive shaft may fictionally engage the aperture. The inner seal assembly additionally comprises a generally convex structure. The inner seal assembly further additionally comprises a perimetrical lip perimetrically secured to the first gasket means on an outer edge of same. The gasket means is circular in shape. The inner seal assembly additionally includes a grease disposed thereon to lubricate and seal the drive shaft member. The inner seal assembly further additionally includes a first inner seal assembly and a second inner seal assembly in combination. The combination of the first inner seal assembly and the second inner seal assembly defines a first generally convex half and a second generally convex half. The first generally convex half and second generally convex half in combination comprises a first generally concave cavity and a second generally concave cavity. The combination of the first generally concave cavity and the second generally concave cavity defines an inner cavity. The inner cavity has a grease means disposed therein for lubricating and sealing the drive shaft. The two halves each comprise a perimetrical lip perimetrically secured therearound for being engaged by a bolt member, or similar securing member as described and well-known in the art. Furthermore, the inner seal assembly still further additionally comprises in combination the first flange member having a first driveshaft opening and the second flange member having a second driveshaft opening and wherein the inner seal assembly is disposed in the first driveshaft opening and the second driveshaft opening.

The improved present invention accomplishes its desired objects by providing a method for sealing a coupling between a drive axle assembly and drive wheel assembly having a caster steering axis inclination (hereinafter referred to as "SAI"), and camber adjustment assembly and for adjusting the caster, SAI, and camber thereof, comprising the steps of:

(a) severing a driven axle housing into a first severed housing portion and a second severed housing portion;

(b) providing a first flange member having a first driveshaft opening and a second flange member having a second driveshaft opening;

(c) securing the first flange member to the first severed housing portion;

(d) securing the second flange member to the second severed housing portion;

(e) disposing an inner seal assembly in the first driveshaft opening and the second driveshaft opening;

(f) coupling the first flange member to the second flange member; and (g) rotating the first flange member relative to the second flange member to achieve adjustment of the caster, SAI, and camber adjustment assembly.

The improved present invention also accomplishes its desired objects by providing a method for sealing an axle housing assembly having a drive shaft and a caster, SAI, and camber adjustment assembly comprising the steps of:

(a) severing a driven axle housing member into a first severed housing portion and a second severed housing portion;

(b) securing a first flange member to the first severed housing portion;

(c) securing a second flange member to the second severed housing portion of the driven axle housing member;

(d) disposing an inner seal assembly in the first cavity and second cavity, between the first flange member and second flange member respectively; and (e) coupling the first flange member to the second flange member.

The improved present invention also accomplishes its desired objects by providing a method for protecting a coupling between a drive axle assembly and a drive wheel assembly having a caster, SAI, and camber adjustment assembly and for adjusting caster, SAI, and camber thereof, comprising the steps of:

(a) severing a driven axle housing into a first severed housing portion and a second severed housing portion;

(b) providing a first flange member;

(c) providing a second flange member;

(d) securing the first flange member to the first severed housing portion;

(e) securing the second flange member to the second severed housing portion;

(f) coupling the first flange member to the second flange member;

(g) rotating the first flange member relative to the second flange member to achieve adjustment of the caster, SAI, and camber adjustment assembly;

(h) disposing an outer flange cover assembly around the first flange member and the second flange member.

The present invention accomplishes its desired objects by broadly providing an inner seal means and/or outer cover means for protecting an axle housing assembly with a wheel SAI, caster, and camber adjustment assembly. The inner seal means comprises a rubber ring member and a lubricating grease. A stiffener ring member may be coupled to the rubber ring member. The inner seal means is disposed between the flanges of the wheel SAI, caster, and camber adjustment assembly. In one embodiment, the inner seal means is disposed in a cavity between the flanges of the wheel SAI, caster, and camber adjustment assembly. The outer cover means comprises a pair of generally semi-circular opposing ring members generally U-shaped in vertical cross-section, a pair of arcuate rubber gasket members attached to the ring members, a hinge assembly member, a pair of lip members secured to the ring members, a bolt member, a wire member, and a lead seal member. The outer cover means is disposed on the assembled flanges of the wheel SAI, caster, and camber adjustment assembly. The inner seal means and the outer cover means may be mutually exclusive of one another. Stated alternatively, the inner seal means and the outer cover means may be used in combination with each other or severally from one another.

The present invention further accomplishes its desired objects by broadly providing a method for sealing a coupling between a drive axle assembly and drive wheel assembly having a caster, SAI, and camber adjustment assembly and for adjusting the caster, SAI, and camber thereof, comprising the steps of:

(a) severing a driven axle housing into a first severed housing portion and a second severed housing portion;

(b) providing a first flange member;

(c) machining the first flange member to produce a first cavity therein;

(d) providing a second flange member;

(e) machining the second flange member to produce a second cavity therein;

(f) securing the first flange member to the first severed housing portion;

(g) securing the second flange member to the second severed housing portion;

(h) disposing an inner seal assembly in the first cavity and the second cavity;

(i) coupling the first flange member to the second flange member; and (j) rotating the first flange member relative to the second flange member to achieve adjustment of the caster and camber adjustment assembly.

The present invention still further accomplishes its desired objects by further broadly providing a method for sealing an axle housing assembly having a drive shaft and a caster, SAI, and camber adjustment assembly comprising the steps of:

(a) severing a driven axle housing member into a first severed housing portion and a second severed housing portion;

(b) securing a first flange member to the first severed housing portion;

(c) securing a second flange member to the second severed housing portion of the driven axle housing member (d) machining the first flange member and the second flange member in a cylindrical fashion to provide a first cavity in the first flange member and a second cavity in the second flange member;

(e) disposing an inner seal assembly in the first cavity and second cavity, between the first flange member and second flange member respectively; and (f) coupling the first flange member to the second flange member.

The present method yet further accomplishes its desired objects by further broadly providing a method for protecting a coupling between a drive axle assembly and a drive wheel assembly having a caster, SAI, and camber adjustment assembly and for adjusting caster and camber thereof, comprising the steps of:

(a) severing a driven axle housing into a first severed housing portion and a second severed housing portion;

(b) providing a first flange member;

(c) providing a second flange member;

(d) securing the first flange member to the first severed housing portion;

(e) securing the second flange member to the second severed housing portion;

(f) coupling the first flange member to the second flange member;

(g) rotating the first flange member relative to the second flange member to achieve adjustment of the caster, SAI, and camber adjustment assembly;

(h) disposing an outer flange cover assembly around the first flange member and the second flange member.

The desired objects of the present invention are still yet further accomplished by providing a method for protecting an axle housing assembly having a drive shaft and caster, SAI, and camber adjustment assembly comprising the steps of:

(a) severing a driven axle housing member into a first severed housing portion and a second severed housing portion;

(b securing a first flange member to the first severed housing portion;

(c) securing a second flange member to the second severed housing portion;

(d) coupling the first flange member and second flange member; and (e) disposing an outer flange cover assembly around the first flange member and the second flange member.

It is therefore an object of the present invention to provide an inner seal assembly and/or outer cover assembly, and a method for sealing a caster, SAI, and camber adjustment assembly.

These, together with the various ancillary objects and features which will become evident to those skilled in the art as the following description proceeds, are attained by this novel combination inner seal assembly and/or cover assembly, and method for protecting a wheel SAI, caster, and camber adjustment assembly, a preferred embodiment being shown with reference to the accompanying drawings, by way of example only, wherein:

BRIEF DESCRIPTION

DETAILED DESCRIPTION OF THE INVENTION

Figure 1:
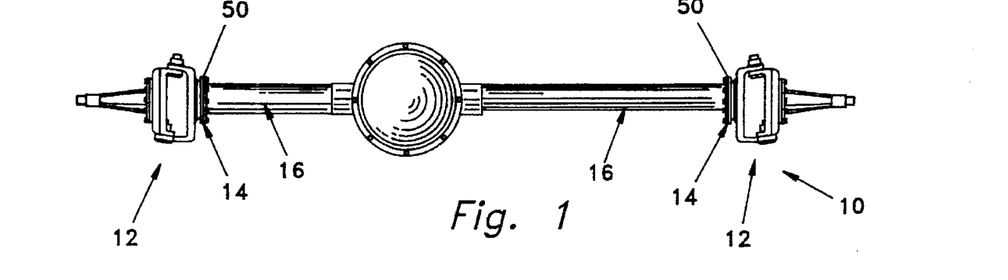
FIG. 1 is a rear elevational view of a driven wheel axle assembly.

Referring now to the drawings wherein similar parts of the invention are identified by like reference numerals there is seen (refer to FIG. 1) an axle assembly 10. The axle assembly 10 is of the type that may be found on any typical four-wheel-drive vehicle, and FIG. 1 depicts the improvement that will become apparent as the following description proceeds. The axle assembly 10 comprises a steering knuckle assembly or drive wheel assembly 12, a wheel steering axis inclination (hereinafter referred to as "SAI"), caster, and camber adjustment assembly 14, a spindle assembly 8 and a drive axle housing assembly 16.

Figure 2:
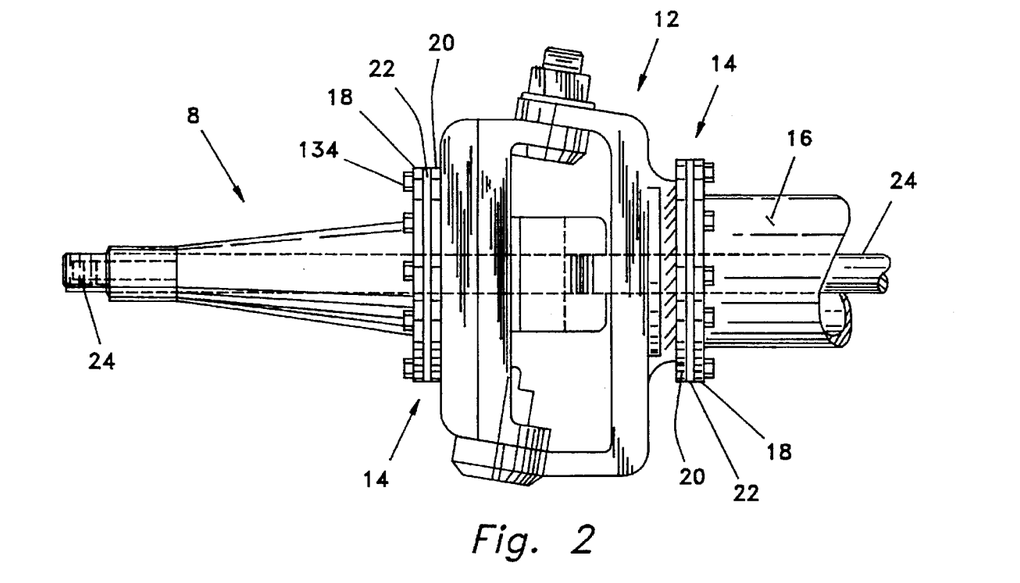
FIG. 2 is side elevational view of a drive wheel assembly, showing the flanges, shim, and bolts of a wheel SAI (steering axis inclination), caster, and camber adjustment assembly, and showing a part of a drive axle assembly.
Figure 9:
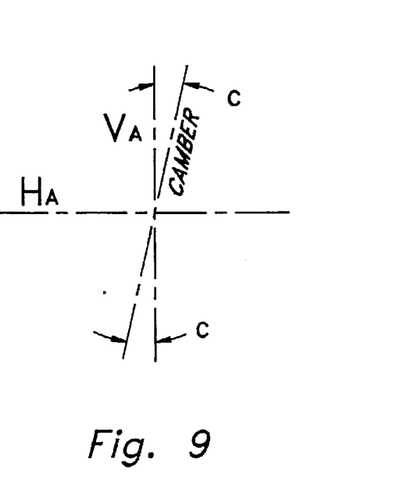
FIG. 9 is a schematic diagram illustrating camber adjustment.
Figure 10:
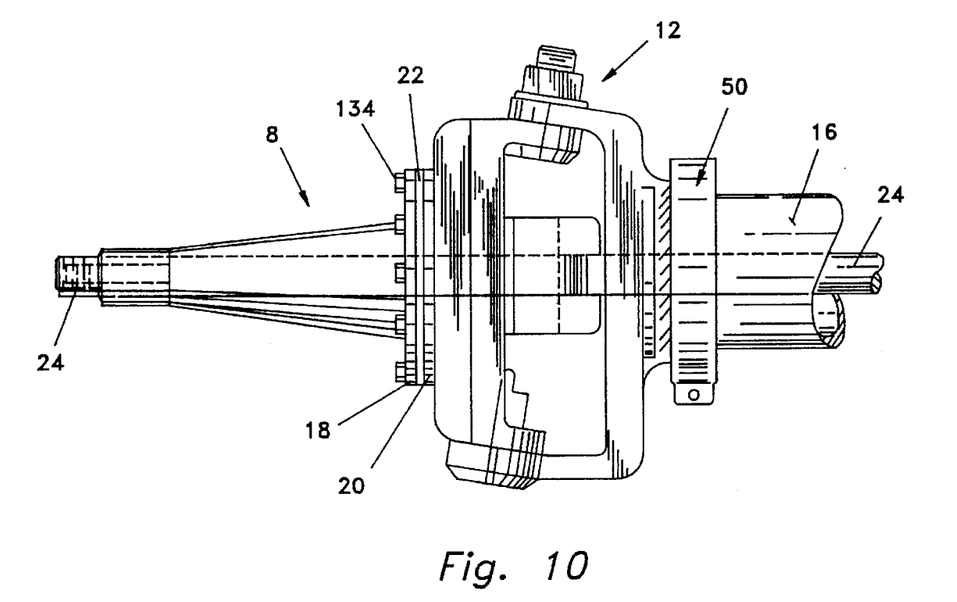
FIG. 10 is a side elevational view of the drive wheel assembly, showing the outer flange cover assembly on the flanges, shim, and bolts of the wheel SAI, caster, and camber adjustment assembly.

The wheel SAI, caster, and camber adjustment assembly 14 is described in U.S. Pat. No. 4,867,472, which is fully incorporated herein by reference thereto as if repeated verbatim hereinafter. As best shown in FIG. 2, the assembly 10 may comprise a pair of adjustment assemblies 14—14 with one adjustment assembly 14 coupling the spindle assembly 8 to the drive wheel assembly 12 and adjusts the camber (as shown in FIG. 9); and the other adjustment assembly 14 coupling the drive wheel assembly 12 to the drive axle assembly 16 and adjusts the caster, the SAI, and camber too. Each of the assemblies 14 are essentially identical and will be described hereafter in terms of describing the assembly 14 that couples the drive axle housing assembly 16 to the drive wheel assembly 12. The wheel SAI, caster, and camber adjustment assembly 14 comprises an inner flange member 18 secured to the drive axle housing assembly 16, an outer flange member 20 secured to the drive wheel assembly 12, and at least one shim member 22 between the inner flange member 18 and outer flange member 20.

Figure 3:
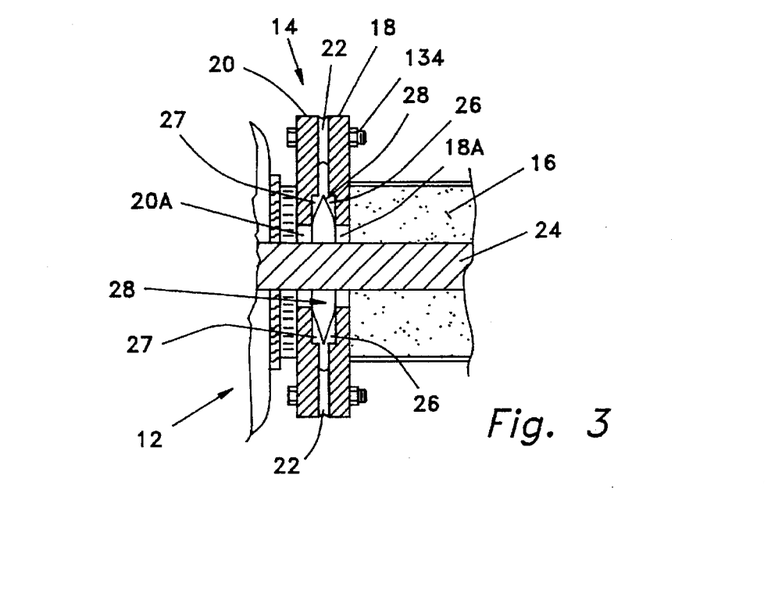
FIG. 3 is a partial cross sectional view of FIG. 2 showing the flanges, shim, and bolts of the wheel SAI, caster, and camber adjustment assembly, and a portion of the drive axle assembly.
Figure 3A:
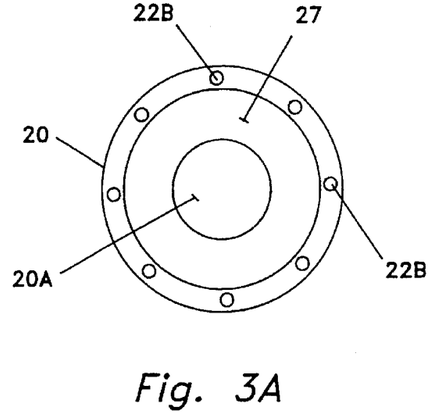
FIG. 3A is front elevational view of one of the flanges with a recess or cavity.
Figure 3B:
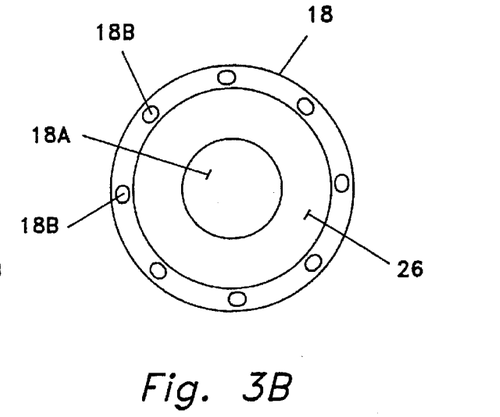
FIG. 3B is a front elevational view of the other flange with a recess or cavity.
Figures 7, 7B:
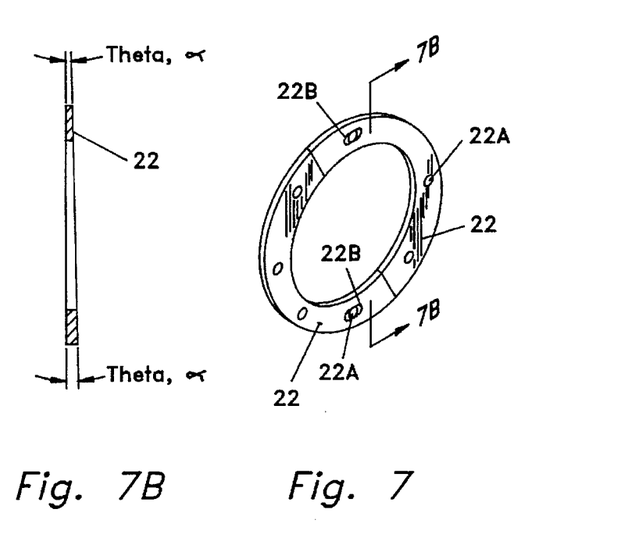
FIG. 7 is a perspective view of the shim.
FIG. 7B is a vertical sectional view taken in the direction of the arrows and along the plane of line 7B—7B in FIG. 7.
Figure 8:
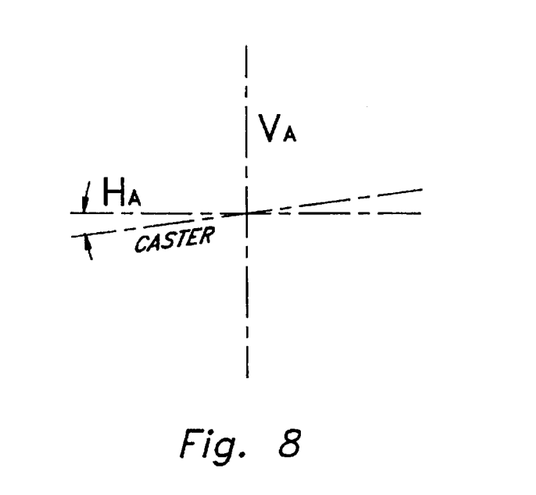
FIG. 8 is a schematic diagram illustrating caster adjustment.

The shim member 22 (which may be defined by a pair of half (or semi-circular) members 22—22) has openings 22A which may possess the form of generally circular, elongated slots 22B or slots 22C (see FIG. 7). As best seen in FIG. 3A, the flange assembly 20 has a plurality of spaced holes or openings 22B. The flange assembly 20 is defined by a ring type structure having a recess or cavity 27. The openings 22B are adapted for receiving bolts 134 or any other similar connector assembly for anchoring flanges 18 and 20 together. The flange assembly 18 (see FIG. 3B) includes a plurality of openings 18B and may also be defined by a ring type structure having a recess or cavity 26. The openings 18B are preferably elongated slots of a suitable width and length so as to provide for infinite rotational adjustment of the flange assembly 18 relative to the flange assembly 20.

The inner flange member 18 and outer flange member 20 may be retrofitted to the axle assembly 10 by separating the drive wheel assembly 12 from the drive axle housing assembly 16 and securing the inner flange member 18 to the drive axle housing assembly 16 and securing the outer flange member 20 to the drive wheel assembly 12. In some cases, the wheel SAI, caster, and camber adjustment assembly 14 may already be installed on the axle assembly 10.

Figure 5:
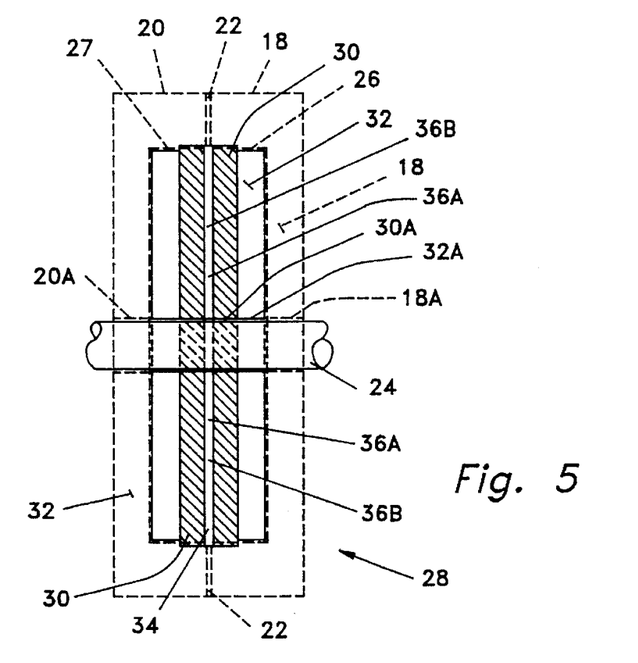
FIG. 5 is a side or vertical cross-sectional view of one embodiment of the inner seal means disposed within the recesses or cavities of the two flanges.
Figure 5A:
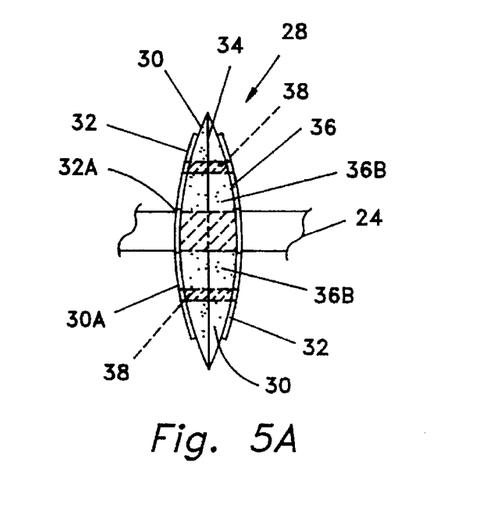
FIG. 5A is a side or vertical cross-sectional view of another embodiment of the inner seal means having the drive shaft rotatably passing therethrough.
Figure 5B:
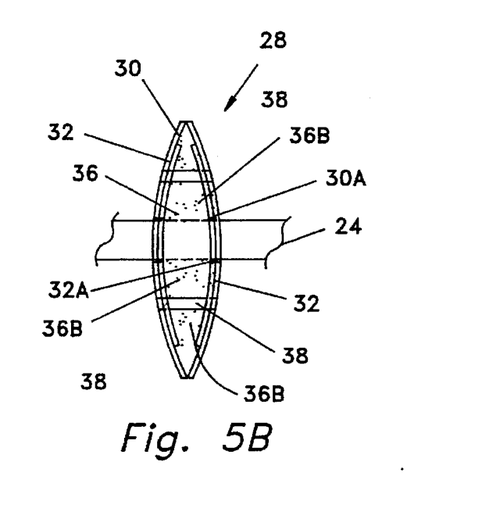
FIG. 5B is a side or vertical cross-sectional view of yet another embodiment of the inner seal means having the drive shaft rotatably passing therethrough.
Figure 5C:
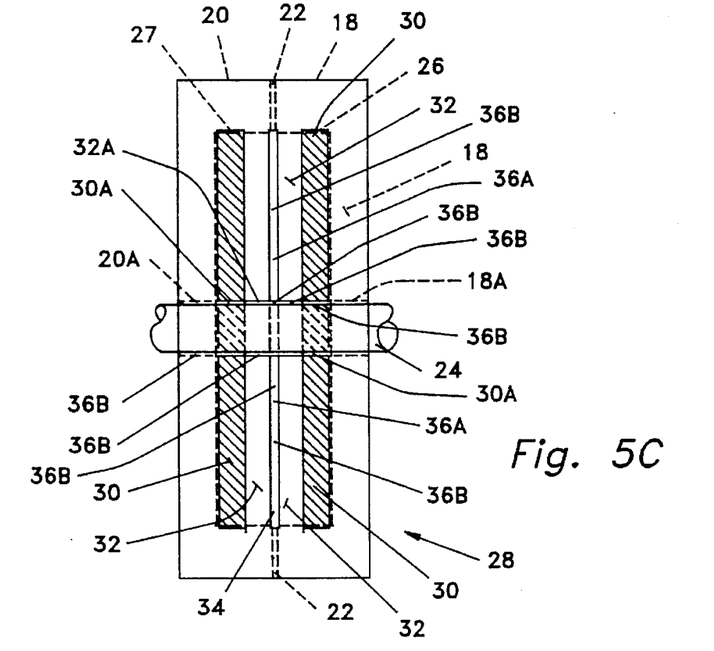
FIG. 5C is a side or vertical cross-sectional view of another embodiment of the inner seal means disposed within the recesses or cavities of the two flanges.

An inner seal means 28 for sealing off a drive shaft 24 member from rain, debris, or the like, is disposed on a drive shaft member 24. The drive shaft member 24 is disposed rotatably inside the drive axle housing assembly 16. The inner seal means 28 is situated on and/or around the drive shaft 24 between the inner flange member 18 and the outer flange member 20. As best shown in FIG. 3, the inner flange member 18 and outer flange member 20 each have been machined to form the inner cavity 26 and the outer cavity 27 respectively, wherein may be disposed the inner seal means 28. Stated alternatively, the flange members 18 and 20 are each machined to respectively form cavities 26 and 27 respectively for accommodating and/or being sealed by the inner seal means 28 to protect the drive shaft 24. Flange members (see FIGS. 3A and 3B) 20 and 18 have openings 20A and 18A formed in and/or through cavities 27 and 26 respectively wherethrough the drive shaft 24 rotatably passes. As best shown in FIGS. 3 and 5 and 5C, the inner seal means 28 seals off the openings 18A and 20A from the cavities 26 and 27 respectively. Additionally the drive shaft member 24 is disposed within the drive axle housing assembly 16, such that it passes through the wheel SAI, caster, and camber adjustment assembly 14 (i.e. through openings 18A and 20A), and through the inner seal means 28 and terminates at the spindle assembly 8.

To further protect the drive axle housing assembly 16 an outer flange cover assembly 50 is disposed on the outer surface of the inner flange member 18 and outer flange member 20, after they have been coupled together. Preferably, the outer flange cover assembly 50 is formed of a material that allows for inspection of the inner flange member 18 and the outer flange member 20 without removal of the outer flange cover assembly 50, such as, by way of example only, clear plastic. The inner seal means 28 and the outer flange cover assembly 50 may be mutually exclusive of one another. Stated alternatively, the inner seal means 28 and the out flange cover 50 may be used in combination with each other or severally from one another.

Figure 4:
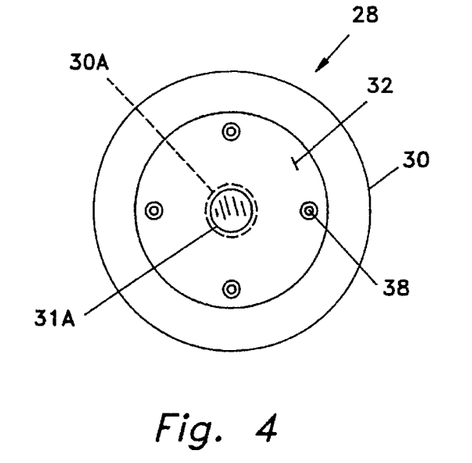
FIG. 4 is a top plan view of one embodiment of the inner seal means.
Figure 4A:
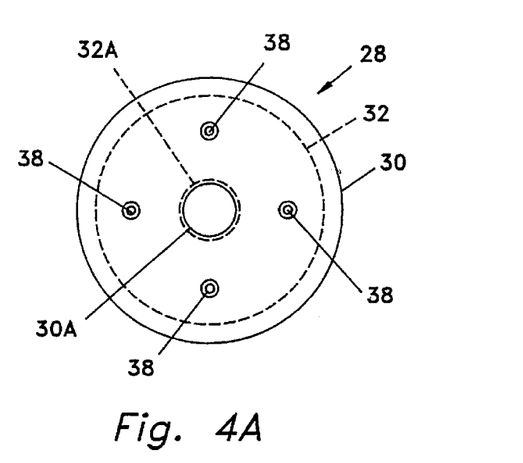
FIG. 4A is a top plan view of another embodiment of the inner seal means.

The inner seal means 28 seals the joint of the inner flange member 18 and the outer flange member 20 from outside debris and water. There inner seal means 28 has a number of preferred embodiments, any of which accomplishes and/or satisfies the objects of the present invention. For the embodiment shown in FIGS. 4 and 5A, the inner flange seal 28 comprises at least one circular (saucer shaped) rubber flap member 30 and at least one stiffener member 32 attached to the rubber flap member 30. The rubber member 30 is longer or has a larger diameter than the stiffener member 32. Preferably, as best shown in FIGS. 4 and 5A, the inner seal means 28 comprises a pair of generally convex rubber flap members 30—30 positional against each other in an opposed relationship, with a pair of stiffener members disposed on the outside thereof for sandwiching the same. A cavity 36 is formulated therebetween the two (2) saucer shaped members 30—30 for retaining grease 36B. In another embodiment the inner seal means 28 may also comprise a gasket member 34 and a fastener means 38, such as a rivet, screw, or plastic resin for securing together two (2) rubber members 30—30 and stiffeners 32—32 to produce the inner seal means 28 (see FIG. 4). In the embodiment for the inner seal means 28 depicted in FIGS. 4A and 5B, the rubber members 30—30 are longer than (or have a larger diameter than) the stiffener members 32—32. As shown in FIG. 5B, both are saucer shaped with the stiffener members 32—32 disposed and encapsulated between the rubber members 30—30 to provide the cavity 36 where grease 36B is disposed. The rubber members 30 and stiffener members 32 are respectively formed with apertures 30A and 32B wherethrough shaft 24 rotatably passes. Apertures 30A and 32B may have grease 36B to facilitate shaft rotation. For the preferred embodiments of the inner seal 28 depicted in FIGS. 5 and 5C, there is seen a pair of rubber members 30—30 and a pair of stiffener members 32—32. One stiffener member 32 and one rubber member 30 are secured together by any suitable means, and a combination of each is respectively disposed in cavities 26 and 27. Each combination is retained in the respective cavities 26 and 27 by the circumferential frictional contact of the rubber member 30 with the inner walls of the cavities 26 and 27. The cavity 36A is formed between contiguous rubber members 30—30 or stiffener members 32—32. This cavity 36B may be filled with grease 36B which may also be disposed between the shaft 24 and apertures 30A, 32A, 18A and 20A.

The stiffener members 32 may be comprised of any material which is suitable for providing support to the rubber flap member 30, such as a metal alloy, plastic polymer, or paper. The rubber members 30 may consist of or be manufactured from any suitable material for sealing purposes (e.g. elastomeric rubbery material, etc.). The stiffener member 32 may be secured to the inside of the rubber flap member 30 or secured to the outside of the rubber flap member 30. The inner flange seal 28 additionally may range from convex to flat in shape, and comprises a structure defining the cavity 36 wherein lubricating grease 36B is disposed. In one preferred embodiment the seal 28 comprises a structure wherein two of the inner seal means 28 are fastened with a fastener means 38 and is then disposed into the inner cavity 26 of the inner flange member 18 and onto the drive shaft member 24 before securing the shim member 22 and outer flange member 20 to the inner flange member 18. The inner flange seal 28 frictionally engages the inner cavity 26 and the outer cavity 27, and sealably passes around the drive shaft member 24, when the inner flange 18, outer flange 20, and shim member 22 are coupled together. The combination of the lubricating grease 36B and rubber flap member 30 seal the drive axle assembly 16 from debris and water. As previously indicated, in another preferred embodiment, the seal 28 is formed from two of the inner flange seals 28. One of the flange seals 28 is disposed on and around the drive shaft member 24 and fictionally engages the inner cavity 26 of the inner flange member 18. Another of the flange seals 28 is disposed in the outer cavity 27 of the outer flange member 20, and the shim member 22, the inner flange member 18, and the outer flange member 20 are all subsequently joined together.

Figure 11:
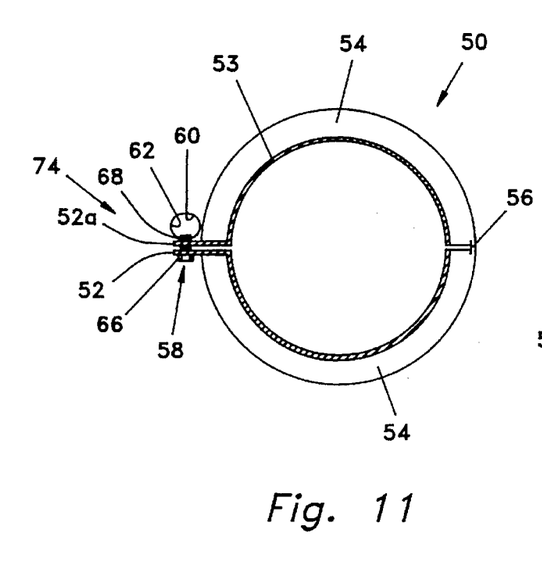
FIG. 11 is a side elevational view of the outer flange cover assembly, detailing the sealing closure assembly of the same.

The outer flange cover assembly 50 (see FIGS. 11 and 12) comprises a pair of generally semi-circular opposing ring members 54, generally U-shaped in vertical cross section. As indicated previously, the outer flange cover assembly 50 may be formed of a material that is clear. Preferably, the opposing ring members 54 are fabricated of a material that is clear, such as, given by way of example only, clear plastic, to allow the flanges 18–20 to be inspected without disassembling or removing the outer flange cover 50 by looking through the opposed ring members 54. The opposing ring members 54 each comprises a structure having a rubber gasket member 53, a lip member 52 secured to one of the ends of the ring members 54 and a hinge assembly 56 secured to the other end of the ring members 54. The lip member 52 comprises an aperture 64 such that a bolt member 58 may slidably pass through the aperture 64. The bolt member 58 additionally comprises a structure defining an end opposite a bolt head 66 (see FIG. 12). The hinge assembly 56 is secured to one end of each of the opposing ring members 54 such that the hinge assembly 56 is inaccessible from the outside of the opposing ring members 54, when said ring members 54 are disposed on the inner and outer flanges 18 and 20.

Figure 12:
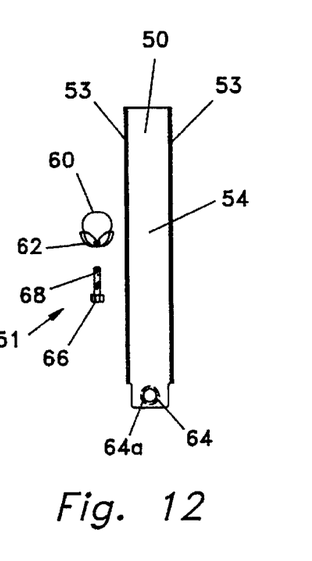
FIG. 12 is a top plan view of the outer flange cover assembly, showing the components of the sealing closure assembly.

The outer flange cover 50 additionally comprises a tamper-evident sealing closure assembly generally illustrated as 74. The closure assembly 74 comprises a wire member 60, a crimp-on lead seal member 62, and the combination of the lip members 52 and 52a, the hinge assembly 56 and the bolt member 58. After the inner flange member 18, outer flange member 20, and shim member 22 are coupled, the outer flange cover 50 is disposed thereon and secured by slidably engaging the bolt member 58 through the apertures 64 and 64a of the lip members 52 and 52a, respectively. The wire member 60 is then disposed through the aperture 68 of the bolt member 58 and the wire member 60 is joined by the crimp-on lead seal member 62, thus providing a tamper-evident seal on the inner and outer flange members 18 and 20.

With continuing reference to the drawings for operation of the invention and the method for sealing a coupling between a drive axle assembly and the drive wheel assembly having a wheel SAI, caster and camber adjustment assembly; and, optionally, for adjusting the wheel SAI, caster, and camber thereof, there is seen (as best shown in FIG. 2) the drive wheel assembly 12 that is interconnected by a pair of adjustment assemblies 14. The adjustment assembly 14 that interconnects the spindle assembly 8 to the drive wheel axis assembly 12 functions for adjusting the camber (as shown in FIG. 9). The adjustment assembly 14 that couples the drive wheel assembly 12 to the drive axle assembly 16 functions to adjust the caster and the SAI, and optionally, the camber also. As previously indicated, there are a number of embodiments for the inner seal means 28, each of which functions for sealing off and protecting the drive axle 24 from foreign contaminated matter, such as water, dirt, or the like. Each of the inner seal means 28 is disposed between the inner flange member 18 and the outer flange member 20 of each of the adjustment assemblies 14. In the embodiment of the inner seal means 28 depicted in FIG. 4 and FIG. 5A, the circular rubber member 30 is longer than the stiffener member 32. Most specifically, as best shown in FIGS. 4 and 5A, there is seen a pair of circular rubber members 30—30 that are mated together and secured (such as by bolts 38 or the like). There is also seen a pair of stiffener members 32—32 which are disposed on the outside surfaces of the rubber members 30 to give the combination rigidity. In FIGS. 4A and 5B, it can be seen that the stiffener members 32—32 are disposed on the inside surfaces of the rubber members 30—30 such that the two stiffener members 32—32 are diametrically opposed to each other. In both embodiments the cavity 36 is provided wherein grease may be disposed to facilitate the rotation of the drive axle 24 through the inner seal means 28. For the embodiments of the invention in FIGS. 5 and 5C, the rubber members 30-30 and the stiffeners members 32—32 are both essentially seated in the cavities 26 and 27 of the flanges 18 and 20 respectfully. In the embodiment of the inner seal means 28 depicted in FIG. 5, a pair of stiffener members 32—32 is disposed on the outside of a pair of circular rubber members 30—30. One stiffener member 32 and one rubber member 30 is completely seated in the cavity 27 of the flange member 20. Similarly, another rubber member 30 and another stiffener member 32 is completely seated in the cavity 27 of the flange member 18. Both rubber members 30 and stiffener members 32 are retained within the cavities 26 and 27 by the fictional engagement of the circumferential surface of the rubber members 30 against the respective walls of the cavity 26 and 27. Grease may be disposed in the cavity 36A that is defined by the opposed rubber members 30—30. Grease may also be disposed between any and all apertures of the stiffener members 26 and 27, and rubber members 30 that rotatably accommodate the drive shaft 24. The shim member 22 is disposed and sandwiched between the flange members 18 and 20. In the embodiment in FIG. 5C, the rubber members 30—30 are interchanged with the stiffener members 32—32 such that the stiffener members 32—32 are continuous to each other when the respective combination of a rubber member 30 and a stiffener member 32 is disposed in the cavities 26 and 27 of the flange members 18 and 20. Again, each combination of a rubber member and a stiffener member is retained in the respective cavities 36 or 37 by the circumferential friction of the rubber members 30 against the respective inner wall of the cavities 26 and 27 of the flange members 18 and 20. The cavity 36A formed between the two opposed stiffener members 32—32 may receive grease, along with any and all apertures that pass through the rubber members 30—30 and the stiffener members 32—32 for rotatably receiving and accommodating the shaft member 24. In both embodiments of the invention depicted in FIGS. 5 and 5C, a rubber member 30 may be secured to a stiffener member 32 by any suitable means, such as by glue or the like (not shown in the drawings), or by the bolt members 38 that are more clearly depicted in FIGS. 5A and 5B. The grease 36B that is disposed between the opposed stiffener members 32—32 (see FIG. 5C) and/or between the two opposed rubber members 30—30 (see FIG. 5) functions to protect the drive shaft from coming in contact with any foreign matter that may seep between and through the connection location of the shim member 22 that is sandwiched between the flange members 18 and 20. After the employment of any of the preferred embodiments for the inner seal means 28 depicted in FIGS. 5A, 5B, 5, and 5C, the flanges 18 and 20 are secured together by the bolts 134 or any other suitable connector assembly. As previously indicated, the shim member 22 is preferably disposed between the pair of flange members 18 and 20. The shim member 22 has been beveled or tapered such as to have an angle B (Beta) on the structural surface thereof. As previously indicated, the apertures or openings 22A in the shim 22 (or shim members 22—22) may have any suitable shape such as to enable rotation of the flange assemblies relative thereto. More specifically, and as described in my U.S. Pat. No. 4,867,472 which has been fully incorporated herein by reference thereto, each half-shim section 22 may be provided with the connector opening 22A which may be in the form of a circular opening, an elongated slot, or an inward elongated slot from the connector opening 22A (see FIG. 10 of U.S. Pat. No. 4,867, 472). The openings 22A are standard holes of a larger size than those of the openings 20B in the flange assembly 20 so as to allow rotational adjustment movement relative thereto. Similarly, the slots in the shim 22 may be elongated similar to the slots 18B in the flange assembly 18 to once again achieve further rotationable adjustment movement. The inward slots are desirable for allowing the half-shim sections 22 to be removed and replaced from between the adjacent clamped portions of the first and second flange members 18 and 20 without removing any bolt member 134 from the threaded openings 22B of the second flange member 20.

Figure 6:
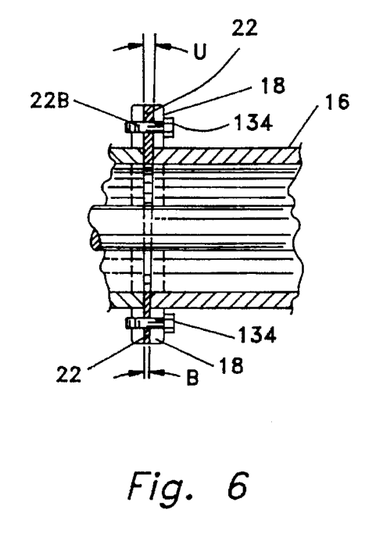
FIG. 6 is a partial cross-sectional view of FIG. 2. showing the flanges, shim, bolts, and disclosing an angular posture of the shim.

After the inner seal means 28 has been disposed between the flange members 18 and 20, the adjustment of the caster is achieved by rotating the outer flange member 20 of the adjustment assembly 14 between the wheel assembly 12 and the axle housing 16 until the proper amount of caster is obtained. The adjustment of the steering axis of inclination is achieved by disposing the shim member 22 between the outer flange member 20 and the inner flange member 18 of the adjustment assembly 14 between the wheel assembly 12 and the axle housing 16 prior to securing the two flange members 18 and 20 together. As previously indicated, the shim member 22 has a taper which is measured by the angle B in FIGS. 6 and 7B. The taper angle B adjusts the steering axis of inclination by changing the vertical angular posture of the wheel assembly 12 relative to the axle housing 16 when the flanges 18 and 20 are secured to each other by bolts 134. It should be noted that the steering axis of inclination adjustment directly affects the camber adjustment, and that both steering axis of inclination and camber may be adjusted at once as previously described above. Additionally, the camber may be adjusted exclusively by disposing another shim member 22 with the taper angle B or another taper angle (such as angle Theta) such that the vertical angular posture of the wheel spindle 8 relative to the wheel assembly 12 is affected.

After the steering axis of inclination and/or camber and caster has been adjusted and the flanges interconnected with or by bolts 134, the outer flange cover assembly 50 may be disposed around either or both of the adjustment assemblies 14 to further protect the drive shaft member 24 from foreign matter that may seep between the two flange members 18 and 20 or between the combination of the flange members 18 and 20 and the shim member 22. Such securing may be facilitated by opening the two semicircular pitted together rings 54 of the outer flange cover assembly 50 and encapsulating the flange members 18 and 20 therebetween. As previously indicated, the closure assembly 74 may be employed to retain the outer flange cover assembly 50 around the two flanges 18 and 20. As further previously indicated, the outer flange cover 50 may comprise a material that is clear to facilitate visual inspection of the flanges 18-20, bolts 134, and/or adjustments thereof without requiring removal or disassembly of the outer flange cover 50. Thus, another salient feature of the present invention is a method that includes looking through the outer flange cover 50 to see and/or inspect flanges 18 and/or 20 and/or bolts 134 and/or disposition of the adjusted flanges 18 and/or 20 and/or bolts 134; thus obviating the removal of the flange cover 50 to view flanges 18 and/or 20 and/or bolts 134. Thus, by the practice of the present invention there is provided the inner seal means 28 and/or the outer cover assembly or means 50, all of which protect an axle housing assembly 10 having a wheel SAI, caster and camber adjustment assembly 14—14. Thus by practice of the present invention there is further provided a method for sealing a coupling (i.e. the pair of flanges 18 and 20) between a drive axle assembly 16 and a drive wheel assembly 12 or a coupling between the drive wheel assembly 12 and the spindle assembly 8, all of which may include a caster and camber adjustment assemblies 14—14 for adjusting the caster and camber thereof. Thus further, by the practice of the present invention there is still further provided a method for sealing an axle housing assembly 16 having the drive shaft 24 and the caster and camber adjustment assemblies 14 and/or a method for protecting the axle housing assembly 16 having the drive shaft 24 and the caster and camber adjustment assemblies 14—14.

Figure 13:
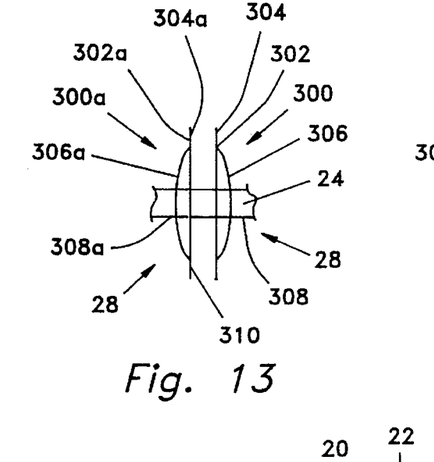
FIG. 13 is a side elevational view of another embodiment of the inner seal means of the invention comprising a pair of rubber gasket members.
Figure 13A:
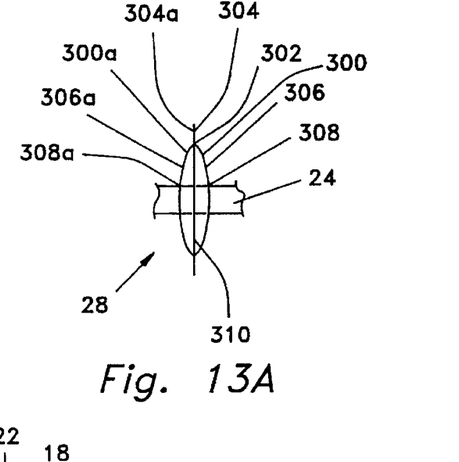
FIG. 13a is a side elevational view of the inner seal means of FIG. 13 with the two rubber gasket members stuck together.
Figure 14:
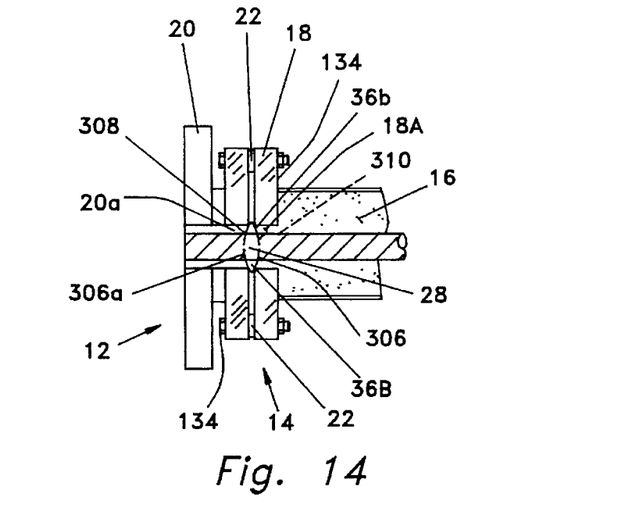
FIG. 14 is a partial cross sectional view of the inner flange, the outer flange, the driveshaft, and the inner seal means of FIG. 13 showing the flanges, shim, and bolts of the wheel SAI, caster, and camber adjustment assembly, and a portion of the drive axle assembly with the two rubber gasket members of the inner seal means installed therein.
Figure 15:
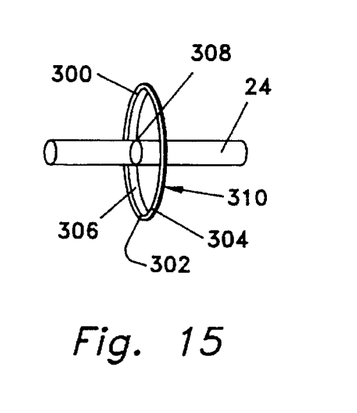
FIG. 15 is a partial perspective view of one rubber gasket member of the inner seal means of FIG. 13 disposed on the driveshaft.
Figure 16:
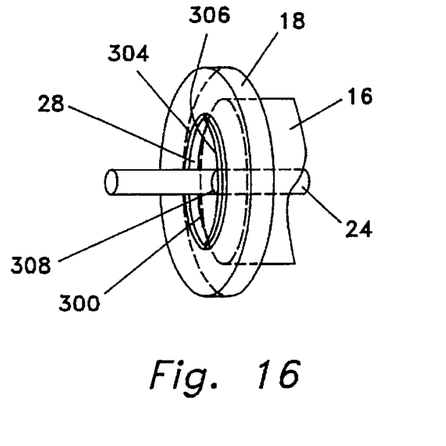
FIG. 16 is a perspective view of the other rubber gasket member of the inner seal means secured to the inner flange member and disposed on the driveshaft.

It is to be understood that the inner seal means 28 may comprise a structure comprising an integrally molded structure from any suitable material, such as given by example only, elastomeric polymers or vulcanized materials. Another embodiment of the inner seal means 28 is accordingly disclosed in FIGS. 13-16. For the embodiment depicted by FIGS. 13-16, the inner seal means comprises a pair of integrally molded, opposed, convex (cup shaped) rubber gasket members 300-300a. The rubber gasket members 300-300a each comprise a perimetrical lip member 304 and 304a respectively secured around an outer perimeter 302 and 302a respectively of a hemispheric dome 306 and 306a respectively thereof. Each rubber gasket member 300 and 300a therefore comprises the dome shaped structure 306 and 306a respectively having the perimetrical lip member 304 and 304a secured integrally respectively thereto or formed therefrom. An aperture 308 and 308a is disposed generally at the apex of the dome 306 and 306a wherethrough the driveshaft 24 may frictionally pass. It should be understood that any suitable manufacturing means and/or material suitable for forming a seal may be used for forming the inner seal means 28, such as by way of example only integral rubber from molding. The perimetrical lip members 304 and 304a are provided to allow the rubber gasket members 300-300a to be secured to the inner flange member 18 and the outer flange member 20 respectively. Any suitable means, given by way of example only, such as rivets, screws, glue, and the like may be used to secure the rubber gasket members 300-300a to the inner flange member 18 and the outer flange member 20, respectively. Preferably, the size of the domes 306 and 306a are generally the same size as the openings 18a-20a of the inner flange 18 and the outer flange 20 (see FIG. 14) such that the domes 306 and 306a of the rubber gaskets 300-300a generally engages the openings 18a-20a of the inner flange 18 and the outer flange 20. Stated alternatively, the dome 306 of rubber gasket 300 is installed into opening 18a of inner flange member 18 and the dome 306a of rubber gasket 300a is installed into opening 20a of outer flange 20 such that the rubber gaskets 300-300a fit together and a cavity 310 is formed between domes 306-306a (see FIGS. 13a and 14) wherein is disposed the lubricating grease 36b, as in the previous embodiment. In this embodiment, the flanges 18-20 are not cylindrically machined to accommodate the inner seal means 28 as the domes 306-306a of the rubber gasket members 300-300a thereof are of a size that is generally accommodated by the openings 18a-20a of the flanges 18-20. This is a salient feature of this embodiment of the inner seal means 28 as the flanges 18-20 are not structurally compromised by machining, and are therefore stronger. It should be understood that, whereas a shape that is generally circular is preferred, any shape for the inner seal means 28 is intended and does not limit the spirit and/or scope of the invention.

Continuing to refer to FIGS. 13-16 for the operation of the alternative embodiment of the inner seal means depicted thereby, the inner seal means 28 is disposed between the inner flange member 18 and the outer flange member 20 of each of the adjustment assemblies 14. For the embodiment of the invention in FIGS. 13 and 15, the rubber gasket members 300-300a are essentially seated in the cavities 18a and 20a of the flanges 18 and 20 respectively. Rubber gasket members 300-300a retained within the cavities 26 by securing the perimetrical lip 304-304a thereof to the flanges 18-20 by any suitable means, such as given by way of example only, glue, screws, or rivets. Grease may be disposed in the cavity 310 that is defined by the opposed rubber gasket members 300-300a. The shim member 22 is disposed and sandwiched between the flange members 18 and 20. The grease 36B that is disposed between the opposed rubber gasket members 300-300a (see FIG. 14) functions to protect the drive shaft 24 from coming in contact with any foreign matter that may seep between and through the connection location of the shim member 22 that is sandwiched between the flange members 18 and 20.

While the present invention has been described herein with reference to particular embodiments thereof, a latitude of modification, various changes, and substitutions are intended in the foregoing disclosure, and it will be appreciated that in some instances some features of the invention will be employed without a corresponding use of other features without departing from the scope of the invention as set forth.

I claim:

1. A method for sealing a coupling between a drive axle assembly and drive wheel assembly having a caster, steering axis of inclination, and camber adjustment assembly comprising the steps of:

(a) severing a driven axle housing into a first severed housing portion and a second severed housing portion;

(b) providing a first flange member having a first flange recess and a second flange member having a second flange recess;

(c) securing the first flange member to the first severed housing portion;

(d) securing the second flange member to the second severed housing portion;

(e) disposing an inner seal assembly in the first flange recess and in the second flange recess;

(f) coupling the first flange member to the second flange member to produce a coupling;

(g) providing an outer flange cover assembly;

(h) disposing the outer flange cover assembly on an outer surface of the first flange member and the second flange member; said outer flange cover assembly comprising two semi-circular opposing ring halves generally U-shaped in vertical cross-section; said ring halves comprising a first end and a second end; said first end comprising a hinge member engaged to one of the ends of each of the ring halves such that said hinge member is inaccessible from outside of said ring halves, and a lip member secured to the other end of each of the ring halves; each of said lip members comprising a structure defining at least one aperture;

(i) disposing a bolt member through the apertures of said lip members, such that the lip members and said bolt member defines a latch assembly; said bolt member having an aperture at one end such that a wire member may be disposed therein; said wire member being joined at both ends by a lead seal means for provision of a tamper-evident seal, such that the bolt member may not be removed without breaking the lead seal means or cutting the wire member, in order to seal said coupling of said step (f).

2. A method for sealing a coupling between a drive axle assembly and drive wheel assembly having a caster, steering axis of inclination, and camber adjustment assemblies comprising the steps of:

(a) providing a driven axle housing defining a first housing portion and a second housing portion with said first housing portion having a first flange member secured thereto defining a first flange recess and a first driveshaft opening and with said second housing portion having a second flange member secured thereto defining a second flange recess and a second driveshaft opening;

(b) providing an outer flange cover assembly;

(c) disposing an inner seal assembly in said first flange recess and said second flange recess;

(d) coupling said first flange member to said second flange member to produce a coupling;

(e) disposing said outer flange cover assembly on the outer surface of said first flange member and said second flange member; said outer flange cover assembly comprising two semi-circular opposing ring halves generally U-shaped in vertical cross section; said ring halves comprising a first end and a second end; said first end comprising a hinge member engaged to one of the ends of each of the ring halves such that said hinge member is inaccessible from the outside of said ring halves, and a lip member secured to the other end of each of the ring halves; said lip member comprising a structure defining at least one aperture; and (f) disposing a bolt member through the apertures of said lip members, such that the lip members and said bolt member define a latch assembly; said bolt member having an aperture at one end such that a wire member may be disposed therein; said wire member being joined at both ends by a lead seal means for provision of a tamper-evident seal, such that the bolt member may not be removed without breaking the lead seal means or cutting the wire member, in order to seal said coupling of step (d).

3. The method of claim 2 additionally comprising rotating said first flange member relative to said second flange member prior to said disposing step (e)

4. The method of claim 2 wherein said ring halves of said outer flange cover assembly are formed of a material that is clear; wherein said inner seal comprises a first rubber gasket means for sealably engaging a drive shaft; said first rubber gasket means having an outer surface; a second rubber gasket means for sealably engaging a drive shaft; said second rubber gasket means having a second outer surface; said first and second rubber gasket means in combination defining two generally convex halves including an inner cavity therebetween; and a grease disposed in said inner cavity.

* * * * *